United States Patent [19]

Chung

[11] 4,199,150

[45] Apr. 22, 1980

[54] NIPPER TYPE RECORD CLEANER

[76] Inventor: Hong P. Chung, No. 591 Chung Chen Rd., Wu Fong Village, Taichung Hsien, Taiwan

[21] Appl. No.: 7,507

[22] Filed: Jan. 29, 1979

[51] Int. Cl.² ............................................. G11B 3/58
[52] U.S. Cl. ................................................... 274/47
[58] Field of Search ............... 274/47; 15/21 D, 97 R, 15/210 R

[56] References Cited

U.S. PATENT DOCUMENTS

| 1,261,688 | 4/1918 | Bratherton | 274/47 X |
| 2,976,551 | 3/1961 | Watts | 274/47 X |
| 3,261,286 | 7/1966 | Hunter et al. | 15/21 D |

FOREIGN PATENT DOCUMENTS 1447634   8/1976   United Kingdom ................. 15/210 R

*Primary Examiner*—Richard E. Aegerter

[57] ABSTRACT

The present invention relates to an improved record cleaner, comprising mainly two cylindrical brushes, an axial lever slightly bent at one end, an L-shape axial lever, a handle body, an operation rod, an operation trigger, a brake button, a connecting plate, a circular plate, spring coils and joint bolts, which cleans a record surface without the defect of bending the record.

3 Claims, 5 Drawing Figures

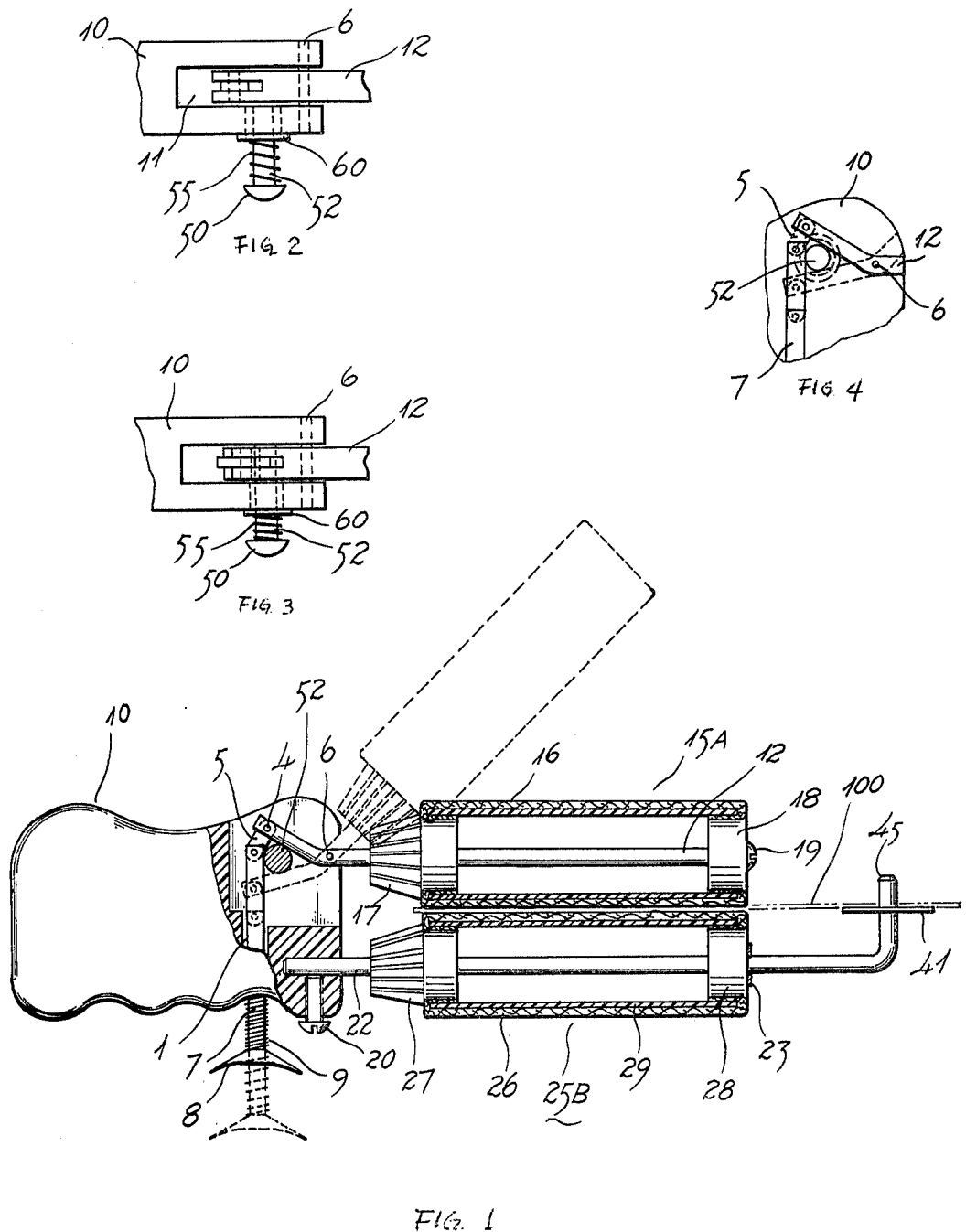

NIPPER TYPE RECORD CLEANER

BACKGROUND OF THE INVENTION

1. Field of the Invention

The present invention provides a kind of nipper type record cleaner whose cleaning is assured, and whose operation is simple and fast, and hence, it prolongs the life of a record.

2. Brief Description of the Prior Art

All music lovers know that the life of a record depends on the maintenance of the record, and the main part of the maintenance is the cleaning of the record. Conventional record cleaners are generally unilateral and usually bend the record when cleaning it because of unbalanced force applied thereon (note that the record is pressed on one side only). Further, hands of the user most frequently than not, touch the sound grooves when holding the record in cleaning, and this, if repeated for a number of times, will damage the sound grooves of the record no matter how slight it may be.

SUMMARY OF THE PRESENT INVENTION

The inventor of the present invention, after years of observation and research, has perfected a kind of record cleaner which cleans both sides of a record in one rotation and which converts the vertical force to a horizontal force applied to the record when cleaning it. The main object of the present invention is to ensure a good and fine cleaning without damaging the rigidity of the record and hence prolong the life of the record.

Another object of the present invention is to provide a mechanism by which the cleaning work can be completed by gripping the record and rotating the same once, hence, the cleaning is simple and fast and the touching of the sound grooves by hands is eliminated to preserve the characteristic of the record.

The object and other advantages will be apparent from the following detailed description with reference to the accompanying drawings.

BRIEF DESCRIPTION OF THE DRAWINGS

FIG. 1 is a partially sectionalized perspective view of the present invention in its employed state;

FIG. 2 is a top view of the square cavity, showing the brake button and the bent axial lever in their free state;

FIG. 3 is a top view of the square cavity, showing the brake button, the brake rod and the curved axial lever, in an engaged state;

FIG. 4 is a front view of a portion of the handle body showing the levers and the brake rod in an engagement state;

DETAILED DESCRIPTION OF THE INVENTION

Figure 5:
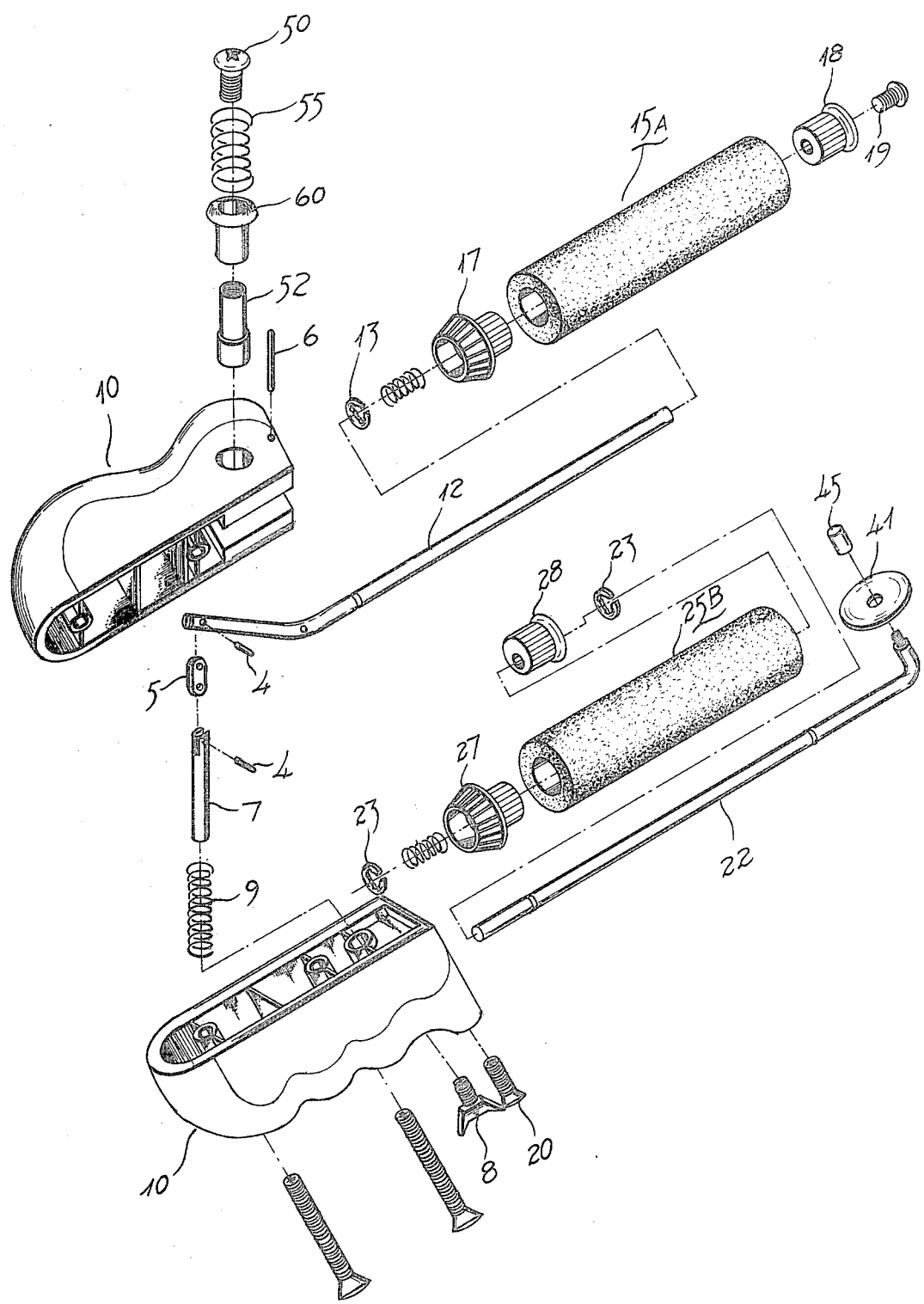
FIG. 5 is an exploded view of the present invention.

FIG. 1 shows a flat handle body 10 with a flat square cavity of suitable size located at its front end and a cylindrical slot 1 located at its lower section, providing a passage for an operation rod 7 and its sliding motion therein. Around the lower section of the operation rod 7 is a spring coil 9 of suitable size and elastic strength and an operating trigger is screwed upon the rear extremity of the rod, gripping the spring coil 9 in between the trigger 8 and the handle body 10. At the upper end of the operation rod 7 is a trough, sandwiching a connecting plate 5 which is connected to an axial lever 12 and received in a fork or groove thereon. The plate 5 is fixed by two joint bolts, one at each end, forming a movable mechanism to facilate operation. The axial lever is fixed to the handle body by means of a joint bolt located in the flat square cavity near the front end of the handle body with the section of the lever between the joint bolt and the connecting plate so bent to facilate lever operation of the axial lever.; A turntable cylindrical brush 15A comprises a hollow cylinder and a cover layer of woolen or similar brush material on the external surface of the cylinder. A collar journal 17, having a slanting bulged top extending outside the cylindrical brush, is inserted tightly into rear end of the hollow cylinder and a short cylinder 18 inserted tightly into the front end of the same, the center holes of the collar journal 17 and the short cylinder 18 being slightly larger than the diameter of the axial lever 12. The outer diameter of the cylindrical journal 17 and the short cylinder 18 being slightly smaller than the diameter of the hollow cylinder, to bind the cover material tightly. A snap ring (13 in FIG. 5) is inserted into a thin groove at the rear end and a screw 19 firmly screws the short cylinder piece 18 to the front end of the axial lever 12 to hold the cylindrical brush 154 properly in position, encasing the axial lever. A second axial lever, 22 extends a length suitably longer than the radius of a record and is bent at the right end to form an L shape bend, with a circular plate secured to the bent portion of the lever by means of a threaded cylinder piece 45. The circular plate 41 being parallel to the longitudianl axis of the second lever. A second cylindrical brush 25B (structure of which being similar to that of 15A) encasing the axial lever 22, A collar journal 27 having an eccentric center hole and having a slanting bulged top is inserted into the rear end and extends partly outside the cylindrical brush, the right end of brush 25B is inserted a short cylinder piece 28 also having an eccentric center hole, eccentricity of the holes in collar journal 27 and cylinder piece 28 provides for adjusting the vertical position of the cylindrical brush, according to the rotational position of the brush. Both ends of the cylindrical brush 25B have thin grooves provided at suitable positions to received snap rings 23 that hold the collar journal and the short cylinder piece and thereby retaining the cylindrical brush in position. FIG. 2 shows a brake button 50 loaded by a spring coil 55, screwed to brake rod 52, and inserted into a cylindrical retainer 60 (shown better in FIG. 5), the button and the retainer assembly is permanently engaged by lightly striking the brake button 50, and the combination is encased in a hole located at the right front end of the handle and through the square cavity.

When operating, initially brush 15A is in the raised position shown dotted. The record 100 is placed on the circular plate and against the cylindrical brush 25B with the cylinder piece 45 passing through the record centerhole. The record 100 being in linear contact with the brush 25B, the operation rod 7 is pushed upward to lower the brush 15A so as to provide a close linear contact with the record 100 (at the time of closing the cylindrical bruch 25B is adjusted by rotation to obtain a selected contact between the brushes and the record). After closing, press the brake button 50 to make brake rod 52 pass under the axial lever 12 in the square cavity. The brake rod between the axial lever 12, the connecting plate and the operation rod 7. By means of the resilient force of the spring coil 9, the axial lever 12 is held pressed against the brake rod 52. The object of cleaning the record can then be attained by holding the handle with one hand and rotating the record 100 with the other hand. After the record is cleaned, the trigger 8 is lightly pressed to allow the brake rod to disengage from its position by means of the restoring force of the spring 55A of the brake button, freeing the brush 15A to move upward by means of the restoring force of the spring coil 9. After removal of the record 100, the device is ready for another operation.

To sum up, the main characteristic of the nipper type record cleaner of the present invention is the cleaning of a record in a single rotation using two cylindrical brushes and by means of an operation rod, springs and other members, wiping out the defects of bending the record and of touching the sound groove when cleaning the record.

What is claimed is:

1. A nipper type of record cleaner comprising:

a handle body containing a cavity in its upper portion, with a cylindrical passage from said cavity passing out to the lower surface of said handle body;

a first axial lever, said lever extending from the said cavity in the handle, said lever being retained by and pivoting about pivot means within the said cavity;

a first cylindrical brush mounted axially upon the extended portion of said axial lever; a second axial lever, having a right angle portion at one end, said right angle portion being of a diameter suitable to fit the center hole of a phonograph record, with the opposite end of said second lever being affixed in the said handle body directly below the said cavity;

a circular plate secured to the right angle portion of the said second axial lever;

a second cylindrical brush mounted in axial alignment but eccentrically upon the said second axial lever, so that rotation of said second brush provides adjustment in the height of the upper surface of the said brush; an operating rod extending through the said cylindrical passage in the said handle body and being connected at its upper end to the end of the said first axial lever is inside the said cavity by a connecting link, said operating rod having an upper trigger at its lower extremity and being biased downward by resilient means so as to raise the said first cylindrical brush which is carried on said first lever; and a brake button assembly providing stop means as to prevent motion of the said upper lever, wherein a record is mounted on the said right angle portion of said second lever, said trigger and operating rod provide means for lowering the said first brush to clamp the record between the said first and second brushes, so that the entire playing surface of the record is cleaned by one rotation of the record between the brushes.

2. A record cleaner as defined in claim 1, wherein the brake button assembly further comprises a brake rod inserted into a cylindrical retainer with bulged periphery, with a surrounding coil spring, the cylindrical retainer being engaged permanently by striking lightly the brake button against the retainer; the combination being installed in a hole which is located in the said handle body, and which hole is transverse to the said cavity in the handle.

3. A record cleaner as defined in claim 1, further consisting of a plate operating between forks in the end of the said operating rod and of the said first axial lever, respectively.

* * * * *